United States Patent
Fujita et al.

(10) Patent No.: US 9,254,600 B2
(45) Date of Patent: Feb. 9, 2016

(54) INJECTION FOAM MOLDING MACHINE (75) Inventors: Saburo Fujita, Nagoya (JP); Takehiro Irie, Nagoya (JP); Keijiro Sugiura, Nagoya (JP); Toshihiko Kariya, Nagoya (JP)

(73) Assignee: MITSUBISHI HEAVY INDUSTRIES PLASTIC TECHNOLOGY CO., LTD., Aichi (JP)

( * ) Notice: Subject to any disclaimer, the term of this patent is extended or adjusted under 35 U.S.C. 154(b) by 668 days.

(21) Appl. No.: 13/264,852

(22) PCT Filed: Nov. 27, 2009

(86) PCT No.: PCT/JP2009/006434
§ 371 (c)(1),
(2), (4) Date: Oct. 17, 2011

(87) PCT Pub. No.: WO2011/039827
PCT Pub. Date: Apr. 7, 2011

(65) Prior Publication Data
US 2012/0034330 A1 Feb. 9, 2012

(30) Foreign Application Priority Data
Sep. 30, 2009 (JP) ................................ 2009-226069

(51) Int. Cl.
*B29C 44/02* (2006.01)
*B29C 45/64* (2006.01)
(Continued)

(52) U.S. Cl.
CPC ............. *B29C 45/66* (2013.01); *B29C 45/6728* (2013.01); *B29C 45/80* (2013.01);
(Continued)

(58) Field of Classification Search
CPC ............ B29C 45/1744; B29C 45/1763; B29C 45/6714; B29C 45/6728; B29C 2045/6785
USPC .......................... 425/150, 190, 589, 590, 595
See application file for complete search history.

(56) References Cited

U.S. PATENT DOCUMENTS 5,066,217 A * 11/1991 Fukuzawa et al. ............ 425/589
6,440,351 B1 8/2002 Saito et al.
(Continued)

FOREIGN PATENT DOCUMENTS

JP 7-080885 A 3/1995
JP 8-216213 A 8/1996
(Continued)

OTHER PUBLICATIONS

International Search Report of PCT/JP2009/006434, mailing date Dec. 28, 2009.
(Continued)

*Primary Examiner* — Joseph S Del Sole
*Assistant Examiner* — Thukhanh T Nguyen
(74) *Attorney, Agent, or Firm* — Westerman, Hattori, Daniels & Adrian, LLP (57) ABSTRACT

An injection foam molding machine of the invention includes: a movable mold platen; a fixed mold platen; a mold fastening hydraulic cylinder that is provided at each of four corners of both mold platens; a tie bar that is driven by the hydraulic cylinder to fasten the molds; two sets of mold opening and closing actuators that drive the movable mold platen to move close to or away from the fixed mold platen; two sets of dedicated core back devices; and a control device that controls the two sets of mold opening and closing actuators and the two sets of dedicated core back devices, wherein the control device includes a dedicated core back program that simultaneously controls the two sets of mold opening and closing actuators and the two sets of dedicated core back devices during a foaming core back operation of moving the movable mold platen away from the fixed mold platen.

11 Claims, 8 Drawing Sheets (51) Int. Cl.
  *B29C 45/80* (2006.01)
  *B29C 45/66* (2006.01)
  *B29C 45/67* (2006.01)
  *B29C 45/68* (2006.01)
  *B29K 105/04* (2006.01)

(52) U.S. Cl.
  CPC . *B29C2045/688* (2013.01); *B29C 2945/76083* (2013.01); *B29C 2945/76227* (2013.01); *B29C 2945/76394* (2013.01); *B29C 2945/76568* (2013.01); *B29C 2945/76709* (2013.01); *B29C 2945/76872* (2013.01); *B29C 2945/76933* (2013.01); *B29K 2105/04* (2013.01)

(56) References Cited

U.S. PATENT DOCUMENTS

| | | | |
|---|---|---|---|
| 7,491,051 B2 * | 2/2009 | Matsushita et al. | 425/595 |
| 8,328,547 B2 * | 12/2012 | Fujita et al. | 425/150 |
| 2006/0246172 A1 * | 11/2006 | Koike et al. | 425/595 |

FOREIGN PATENT DOCUMENTS

| | | |
|---|---|---|
| JP | 2000-06213 A | 1/2000 |
| JP | 2002-321262 A | 11/2002 |
| JP | 2003-305759 A | 10/2003 |
| JP | 2004-098582 A | 4/2004 |
| JP | 2005-205819 A | 8/2005 |
| JP | 2005-335072 A | 12/2005 |
| JP | 2005-342935 A | 12/2005 |
| JP | 2006-289861 A | 10/2006 |
| JP | 2008-001092 A | 1/2008 |
| JP | 2008-055693 A | 3/2008 |
| WO | 2008/139751 A1 | 11/2008 |

OTHER PUBLICATIONS

Written Opinion of PCT/JP2009/006434, mailing date Dec. 28, 2009.

\* cited by examiner

INJECTION FOAM MOLDING MACHINE

TECHNICAL FIELD

The present invention relates to a configuration of an injection foam molding machine that molds a foamed and molded product with high precision by slightly opening a mold to foam a foaming molten resin injected and filled into a mold cavity.

Priority is claimed on Japanese Patent Application No. 2009-226069, filed Sep. 30, 2009, the content of which is incorporated herein by reference.

BACKGROUND ART

Hitherto, an injection foaming and molding operation using an injection molding machine has been performed in a manner such that a heated and plasticized foaming resin is rapidly injected and filled into a mold cavity, a surface of a molded product contacting a mold is cooled and solidified after the resin injecting and filling operation, and a gap between molds is widened to reduce the internal pressure of the molded product and foam and expand the inside of the molded product. Due to such an injection foaming and molding operation, a molded product may be obtained which has a good appearance and is light and tough.

A foaming resin molding machine of the related art shown in PTL 1 will be described. The injection foam molding machine is a molding machine in which four sets of movable mold moving mechanisms are provided at either a movable mold platen or a fixed mold platen. In the movable mold moving mechanism, a nut is linearly moved by a screw driven by a servo motor, and one end surface of the nut comes into contact with the other mold platen so that the molds move away from each other. When the movable mold is moved in the mold opening direction by the mechanism, the movable mold is slightly opened while applying a load in the mold closing direction using a mold opening and closing mechanism or a mold fastening mechanism.

CITATION LIST

Patent Literature

[PTL 1] Japanese Patent Application Laid-Open No. 2002-321262

SUMMARY OF INVENTION

Technical Problem

In the related art of PTL 1, since four sets of slight opening devices each including an expensive servo motor unit are needed, the cost is expensive. Further, the movement of the movable mold platen is performed by the movable mold moving mechanism during the core back operation. For this reason, a mold opening and closing hydraulic side cylinder directly fixed to the movable mold platen and a mold fastening cylinder (not shown) fixed to the movable mold platen through a tie bar are moved in the mold opening direction by the mold moving mechanism. During this movement, the volumes of the mold opening oil chambers of the hydraulic side cylinder and the mold fastening cylinder are expanded, and in a hydraulic circuit communicating with the mold opening oil chambers, the same effect as that of a suction piston pump is exhibited, so that a negative pressure is generated in the mold opening oil chambers. Usually, in order to compensate the expanded volumes of the mold opening oil chambers, the mold opening oil chambers communicate with an oil tank during the core back operation. The oil stored in the oil tank is suctioned by the negative pressure of the mold opening oil chambers, so that the oil flows into the mold opening oil chambers. At this time, since the mold opening oil chambers need to suction the oil of the oil tank against the weight and the flowing resistance of the oil so that the oil flows thereinto, the negative pressure of the mold opening oil chambers increases in consideration of the density or the high viscosity (low fluidity) of oil.

In accordance with the negative pressure inside the mold opening oil chamber, a force of pulling the rams of the hydraulic side cylinder and the mold fastening cylinder in the mold closing direction increases, and a mold opening speed becomes slower. In particular, when the mold opening speed becomes slower, foaming bubbles causing a degradation of the rigidity of the molded product is coarsened. Further, when the pressure of the oil suctioned from the oil tank becomes lower than the saturated vapor pressure due to the negative pressure of the mold opening oil chambers, there is concern in that cavitations are generated and a hydraulic pipe is broken.

For this reason, since the negative pressure of the mold opening oil chamber serves as a resistance of the movement of the movable mold platen in the mold opening direction and a factor degrading the mold opening speed during the core back operation, a core back device with large thrust is needed.

Further, the core back device disclosed in PTL 1 is fixed to the movable mold platen, but is not fixed to the fixed mold platen. When the movable mold platen moves too far (the distance between the movable mold platen and the fixed mold platen is widened too much), in order to shorten the distance between the movable mold platen and the fixed mold platen, the servo motor of the core back device is reversely rotated to move the ball screw toward the movable mold platen. However, since the end of the core back device coming into contact with the fixed mold platen is not fixed to the fixed mold platen, the surface of the ball screw contacting the fixed mold platen is detached therefrom, so that the position of the movable mold platen in the mold closing direction may not be corrected by the core back device.

When the same mold is loaded on different molding machines, there is concern in that the thickness of the cavity is different when the core back operation is completed in the different molding machine due to a difference in inclination of the mold platen caused by the assembly error or the molding machine even when the same core back control setting value is used. Further, when there is a difference in thickness of the cavity of the mold due to a change in age, there is concern in that the thickness of the cavity becomes different even when the parallelism of the fixed mold and the movable mold is maintained.

Further, although the mold platen is slightly deformed since it is bent by a force of the core back device pressing the mold platen during the core back operation, when the core back device is attached to a position where the bending rigidity of the mold platen is low, the mold platen is largely bent and deformed, so that the core back control necessary for the minute mold platen position control is disturbed and the precision of the core back control is degraded. As a result, there is concern in that the quality of the foamed molded product is degraded.

Further, the core back device needs to be installed outside the mold attachment region of the mold platen, but in the existing mold platen, no region for installing the core back device is provided in many cases. For this reason, in order to install the core back device at the mold platen while a sufficient function and a core back precision are ensured, the mold platen of the core back device needs to be replaced by a mold platen having an attachment region and sufficient rigidity of preventing the mold platen from being easily deformed by the core back force, but such a countermeasure leads to an increase in cost.

It is an object of the invention to provide an injection foam molding machine which may decrease the size and the number of core back devices and is cheap by performing a core back operation using both a dedicated core back device and a mold platen moving device originally included in the injection molding machine. Also, it is an object of the invention to provide an injection foam molding machine which may reduce the core back resistance and prevent a decrease in mold opening speed by filling a mold opening oil chamber of a mold fastening cylinder with unload oil of a hydraulic circuit during the core back operation.

Solution to Problem

The invention solves the above-described problems by the following configuration.

An injection foam molding machine of the invention includes: a movable mold platen; a fixed mold platen; a mold fastening hydraulic cylinder that is provided at each of four corners of both mold platens; a tie bar that is driven by the hydraulic cylinder to fasten the molds; two sets of mold opening and closing actuators that drive the movable mold platen to move close to or away from the fixed mold platen; two sets of dedicated core back devices; and a control device that controls the two sets of mold opening and closing actuators and the two sets of dedicated core back devices, wherein the control device includes a dedicated core back program that simultaneously controls the two sets of mold opening and closing actuators and the two sets of dedicated core back devices during a foaming core back operation of moving the movable mold platen away from the fixed mold platen.

The dedicated core back device may be an electrically driven core back device in which a motor, a large deceleration ratio planetary gear speed reducer, and a ball screw shaft are disposed in series and fixed to one of the movable mold platen and the fixed mold platen, and the movable mold may be slightly opened in a manner such that a nut driven by the ball screw presses a surface of a mold platen of the other of the movable mold platen and the fixed mold platen.

The mold opening and closing actuator may be a mold opening and closing ball screw unit that includes a servo motor, a speed reducer, a ball screw shaft, and a ball screw nut threaded into the screw shaft.

The mold opening and closing actuator may be a hydraulic actuator that includes a hydraulic cylinder, a position sensor detecting a position of an operation shaft of the hydraulic cylinder, and a servo valve.

The dedicated core back device may include a core back driving hydraulic cylinder and a position sensor detecting a position of an operation shaft of the hydraulic cylinder, and the mold opening and closing actuator may be a mold opening and closing ball screw unit that includes a servo motor, a speed reducer, a ball screw shaft, and a ball screw nut threaded into the screw shaft.

The dedicated core back program may independently control the two sets of mold opening and closing ball screw units and the two sets of dedicated core back devices on the basis of respective predetermined core back target stop reference position values. Respective stop position offset target values of the two sets of mold opening and closing ball screw units and the two sets of dedicated core back devices may be set with respect to the core back target stop reference position values. The core back amounts of the two sets of mold opening and closing ball screw units and the two sets of dedicated core back devices may be independently controlled in a manner such that values respectively obtained by adding or subtracting the respective corresponding stop position offset values to or from the respective core back target reference position values are set as respective core back target completion position values.

The dedicated core back program may perform a master-slave control so that the position or the speed of the dedicated core back device follows the average value of the moving amount or the moving speed of the hydraulic cylinder measured by the position sensor by master-controlling the position or the speed of the hydraulic cylinder and slave-controlling the position or the speed of the dedicated core back device.

The dedicated core back program may perform a master-slave control so that the position or the speed of the mold opening and closing ball screw unit follows the average value of the moving amount or the moving speed of the hydraulic cylinder measured by the position sensor by master-controlling the position or the speed of the hydraulic cylinder and slave-controlling the position or the speed of the mold opening and closing ball screw unit.

The hydraulic cylinder may be segmented into a mold opening oil chamber and a mold fastening oil chamber by a ram moving the tie bar forward and backward. The injection foam molding machine may further include a bypass hydraulic pipe allowing the mold opening oil chamber and the mold fastening oil chamber to communicate with each other and a switching valve provided on the bypass hydraulic pipe to be switched to any one of a communication state and a non-communication state between the mold opening oil chamber and the mold fastening oil chamber. During the core back operation using the two sets of mold opening and closing actuators and the two sets of dedicated core back devices, the dedicated core back program may open the switching valve so that the mold opening oil chamber, the mold fastening oil chamber, and an oil tank communicate with each other and an unloading oil circulating unloading hydraulic pipe at a hydraulic source communicates with the bypass hydraulic pipe. When the core back operation is not performed, the bypass hydraulic pipe and the unloading hydraulic pipe may not communicate with each other.

The fixed mold platen may include a substantially cylindrical first rib formed at the center of the fixed mold platen and a second rib radially connecting the first rib and the hydraulic cylinder to each other from the first rib. The dedicated core back device may be installed so that the attachment center of the dedicated core back device is present on an inner wall of the mold fastening cylinder on the extension line of the second rib.

The injection foam molding machine may further include a core back device attachment plate that is detachably attached to each mold attachment surface of the fixed mold platen or the movable mold platen and is used to attach the dedicated core back device to a position not interfered with by a mold attachment region of the mold platen.

Advantageous Effects of Invention

According to the injection foam molding machine of the invention, when the molten foaming resin injected and filled in the mold cavity is foamed by slightly opening the mold (a core back operation), the core back operation may be performed by using both two sets of dedicated core back devices and two sets of mold opening and closing ball screw devices as driving unit for widening a gap between both die plates. For this reason, when there is a need for performing the core back operation, only two sets of dedicated core back devices may be further provided in a standard injection molding machine without a core back function, so that the dedicated core back device may be decreased in size, number, and cost.

Since there is no need to reconstruct an expensive servo motor in the existing injection molding machine, an increase in reconstruction cost as the injection foam molding machine may be further suppressed.

Further, when there is a difference in thickness of the cavity of the mold due to a change in age or an inclination degree of the mold platen caused by a difference between molding machines (individual difference), the mold platen stop position of each core back shall may be independently corrected. Accordingly, the actual thickness of the molded product may be uniformly corrected in a manner such that the core back amount at the side with the thick thickness of the cavity is made small or the core back amount at the side with the thin thickness of the cavity is made large.

Further, since the molded product is not easily separated from the mold when projecting the molded product, the position of the mold platen when completing the core back operation is made slightly different for each shaft of the core back device, so that the molded product is substantially solidified at the thickness of the shaft with a small core back amount. For this reason, in the periphery of the shaft with a large core back amount, the molded product may not follow the mold opening operation, and the surface of the molded product is separated (or easily separated) from the wall of the cavity, so that the molded product may be easily projected by an ejector.

Since the mold opening oil chamber of which the volume expands during the core back operation is connected to not only the line of the oil tank, but also the unloading hydraulic pipe of unload oil circulating with a low pressure to a hydraulic source, the hydraulic oil is actively supplied to the mold opening oil chamber, so that the oil may be easily made to flow into the mold opening oil chamber during the core back operation. Accordingly, since the negative pressure of the mold opening oil chamber disturbing the core back operation may be suppressed, the core back force may be reduced, the core back device may be decreased in size and number, and cavitations inside the hydraulic pipe may be prevented.

Since the operation point of the core back device is provided on the wall of the cylinder along the extension line of the rib with high bending rigidity and a small bending amount of the mold platen, the bent and deformation amount of the mold platen disturbing the core back operation may be reduced, and an adverse influence on the core back movement control may be suppressed.

Since the fixed mold platen or the movable mold platen includes the core back device attachment plate that may be detachably attached to each mold attachment surface and has a region where the core back device is attached to a position not causing an interference with the mold attachment region originally included in the mold platen, the core back device may be easily installed even in the existing mold platen when reconstructing the injection foam molding machine. Furthermore, since the core back device attachment plate also serves as the mold attachment plate, the deformation amount of the core back device attachment portion against the core back force may be suppressed due to high rigidity of the mold attachment portion integrated with the core back attachment portion. Further, since the core back device attachment plate is attachable and detachable, the injection foam molding machine may be easily restored and reconstructed as the general injection foam molding machine, and an increase in reconstruction cost may be suppressed.

DESCRIPTION OF EMBODIMENTS

First Embodiment

A first embodiment will be described by referring to the drawings.

Figure 1:
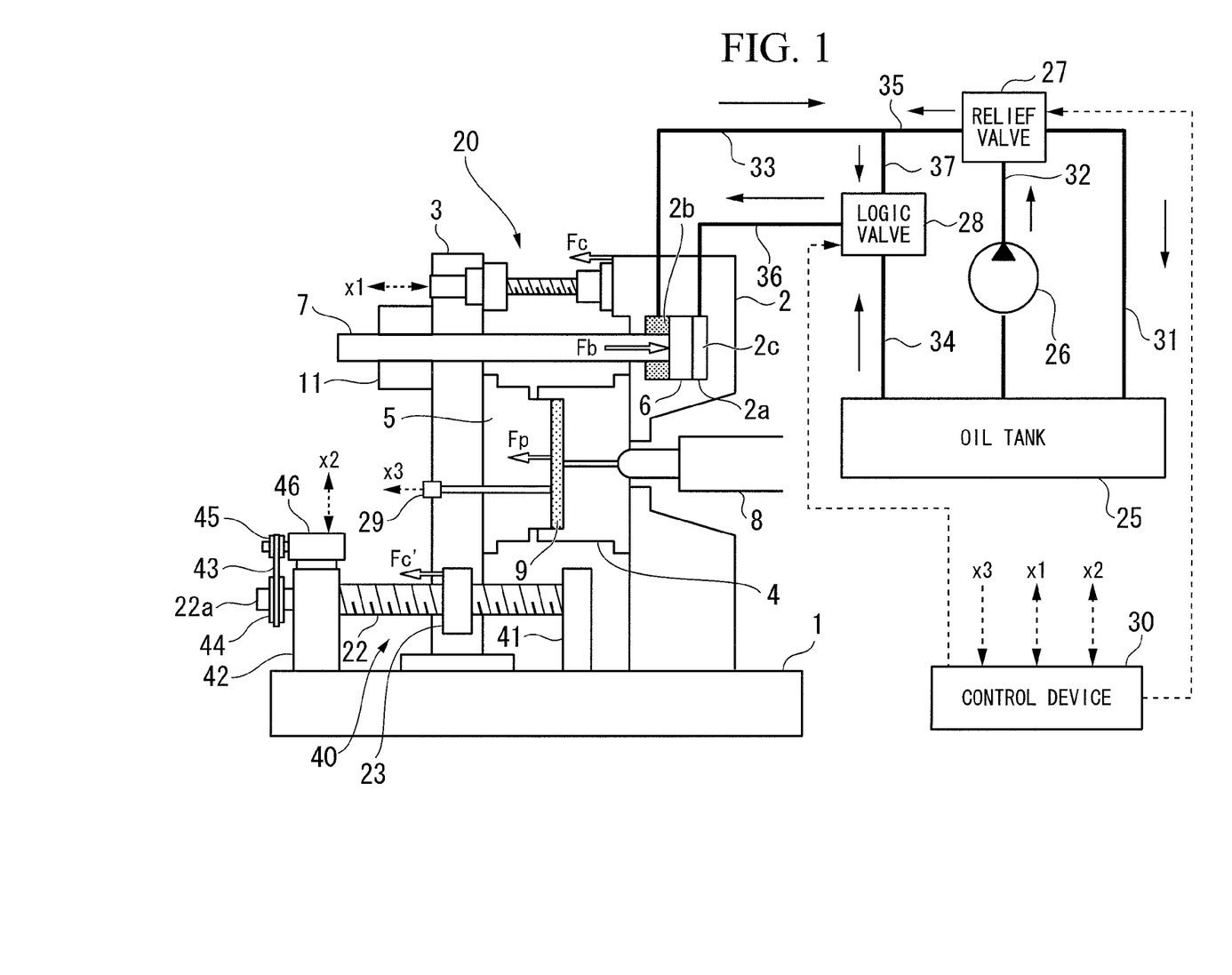
FIG. 1 is a side view illustrating a control system of an injection foam molding machine according to a first embodiment of the invention.
Figure 2:
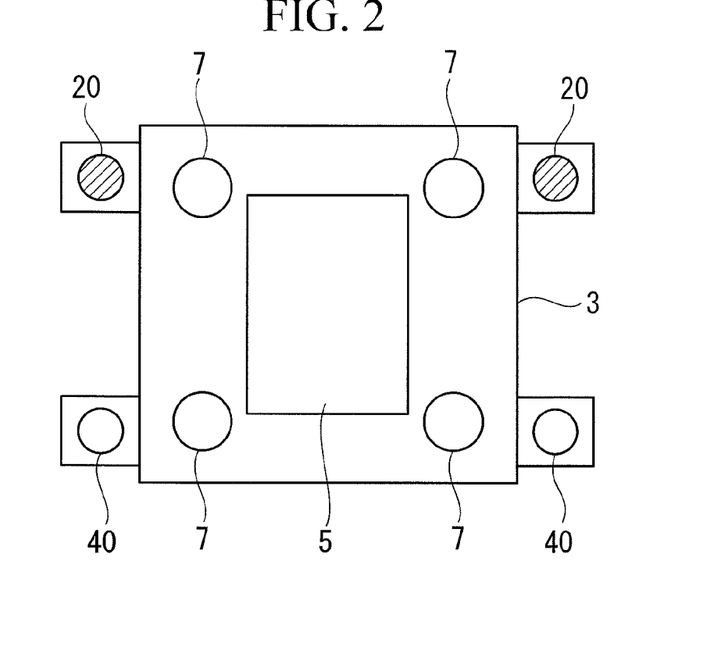
FIG. 2 is a front view illustrating a movable mold platen of the injection foam molding machine of FIG. 1.
Figure 3:
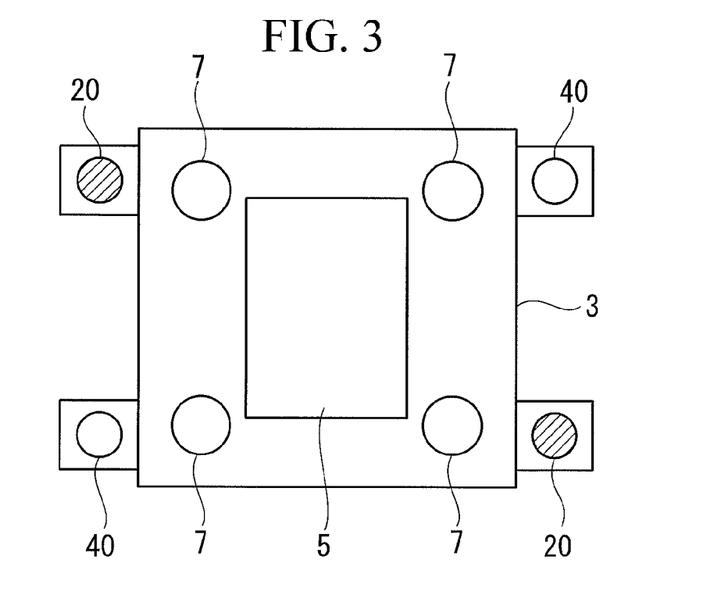
FIG. 3 is a front view illustrating the movable mold platen in which a layout position of a core back device of the injection foam molding machine of FIG. 1 is changed.
Figure 4:
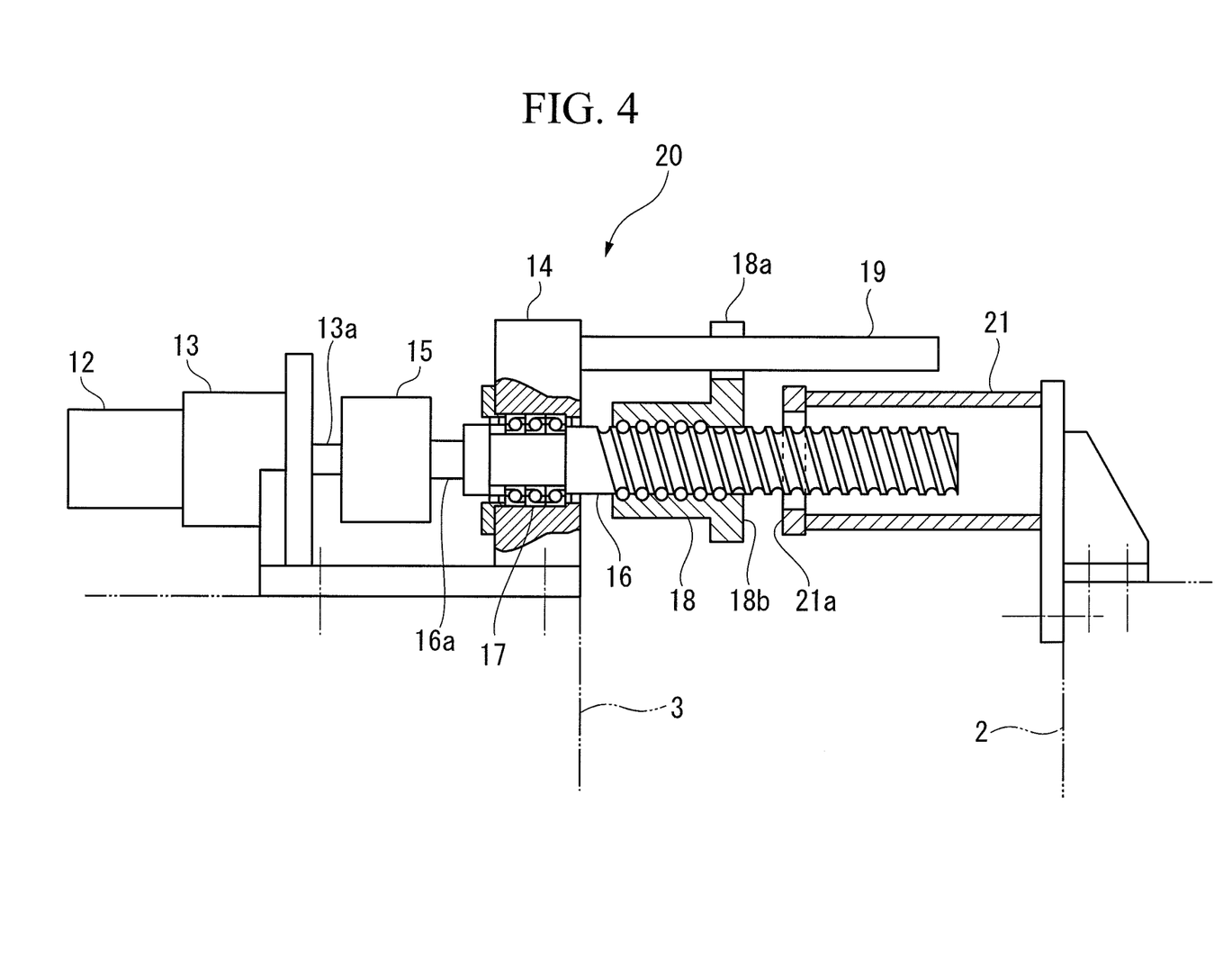
FIG. 4 is a side view specifically illustrating the core back device of FIG. 1.

FIG. 1 is a side view illustrating a control system of an injection foam molding machine according to a first embodiment of the invention, FIG. 2 is a front view illustrating a movable mold platen of the injection foam molding machine of FIG. 1, FIG. 3 is a front view illustrating the movable mold platen in which a layout position of a core back device of the injection foam molding machine of FIG. 1 is changed, and FIG. 4 is a side view specifically illustrating the core back device of FIG. 1.

In these drawings, a fixed mold platen 2 having a fixed mold 4 attached thereto is fixed to one end of a base platen 1. Four mold fastening cylinders 2*a* with a short stroke and a large cross-sectional area are built in the fixed mold platen 2, and are provided to be symmetrical to each other with respect to the center line of the corners of the fixed mold platen 2 as shown in FIG. 2, so that a mold fastening operation may be performed by a hydraulic pressure.

A movable mold platen 3 having a movable mold 5 attached thereto and facing the fixed mold platen 2 is movably placed on the base platen 1. The movable mold platen 3 may open and close the movable mold 5 with respect to the fixed mold 4 in a manner of moving on the base platen 1 using ball screw mold platen opening and closing unit 40 configured by the combination of a ball screw 22 and a nut 23 fixed to the movable mold platen 3 and threaded into the ball screw 22.

In the ball screw mold platen opening and closing unit 40, the ball screw shaft 22 is restrained by supports 41 and 42 fixed to the base platen 1 in the radial and thrust directions, and is rotatably supported thereto. The ball screw shaft 22 is rotationally driven by a servo motor 46, a small cog belt pulley 45, a cog belt 43, and a large cog belt pulley 44.

When the servo motor 46 is rotated in response to a control signal from a control device 30 at the time of opening and closing the molds, the ball screw shaft 22 is rotationally driven, and the nut 23 is axially pressed so as to move the movable mold platen 3 (to perform the movement and the core back operation of the movable mold platen 3).

Tie bars 7 are directly coupled to one side surface of a ram 6 sliding on the inside of a mold fastening cylinder 2a, and when the movable mold platen 3 facing the fixed mold platen 2 moves close to the fixed mold platen upon opening and closing the mold, the tie bars 7 penetrate a plurality of insertion holes formed at the corresponding positions of the movable mold platen 3.

At the time of closing the mold, the movable mold platen 3 moves toward the fixed mold platen 2, each tie bar 7 penetrates the insertion hole of the movable mold platen 3, and tie bar fixing unit 11 fixes the tie bar 7 to the mold platen 3.

After closing the mold, the mold is fastened by the mold fastening cylinder 2a, and a molten resin is injected from an injection cylinder 8 into a cavity 9. Subsequently, at the time point when the resin contacting the mold is solidified, the mold opening and closing ball screw 22 and a core back device 20 press the movable mold platen 3 to be slightly operated and open the molds 4 and 5, so that the molten resin is foamed and expanded. One or a plurality of in-mold pressure sensors 29 is attached to the movable mold platen 3, and penetrates the movable mold 5 to detect the resin pressure inside the cavity 9.

The core back operation of slightly opening the gap between the fixed mold 4 and the movable mold 5 up to a set position at the time of foaming and molding is performed by simultaneously controlling the movement of the mold platen opening and closing unit 40 and the movement of the core back device 20 dedicated for the core back operation. Two core back devices 20 are installed at both upper sides of the movable mold platen 3 as shown in FIGS. 1 and 2 or are installed at the diagonal positions as shown in FIG. 3. The positions shown in FIG. 3 may correspond at the time of further installing the core back device 20 when the mold platen opening and closing unit 40 are installed at the diagonal positions of the mold platen of the existing injection molding machine.

A detailed structure of the core back device 20 will be described by referring to FIG. 4. A core back device support plate 14 is fixed to the movable mold platen 3. A large deceleration ratio planetary gear speed reducer 13 directly coupled to a servo motor 12 is fixed to the core back device support plate 14. A shaft end 16a of a ball screw 16 is coupled to an output shaft 13a of the large deceleration ratio planetary gear speed reducer 13 through a coupling 15. The servo motor 12, the large deceleration ratio planetary gear speed reducer 13, the output shaft 13a, the coupling 15, and the ball screw 16 are disposed in series. When the components of the core back device 20 are disposed in series by using the large deceleration ratio planetary gear speed reducer 13, the size of the core back device may be decreased and the space thereof may be saved compared to the case where a different deceleration type speed reducer having substantially the same deceleration ratio is used. Further, the ball screw 16 may be supported to be freely movable in the radial direction and be strongly restrained in the thrust direction by a plurality of ball bearings 17 attached to the core back device support plate 14.

Since a ball screw nut 18 is threaded into the ball screw 16 and the rotation of the nut 18 is prohibited at an end 18a with respect to the core back device support plate 14 through a locking pin 19, when the ball screw 16 is rotationally driven, the nut 18 may move in the axial direction of the ball screw 16 while being restrained in the rotation direction. A contact support 21 is fixed and attached to the fixed mold platen 2 in the end surface of the fixed mold platen 2 facing the movable mold platen 3. When the mold is fastened, the nut 18 is set by the ball screw 16 at a position where the end surface 18b of the ball screw nut 18 does not come into contact with a contact surface 21a of the contact support 21 with an extremely slight gap therebetween.

A hydraulic system performing a movement and the like of the movable mold platen 3 for mold fastening and foaming expanding will be described. In FIG. 1, a hydraulic control circuit of the mold fastening cylinder 2a includes the control device 30, a hydraulic pump 26, an electromagnetic proportional control relief valve 27 capable of changing a hydraulic pressure of a hydraulic oil supplied from the hydraulic pump 26 into two stages, that is, a high pressure and a low pressure, a logic valve 28 capable of switching the hydraulic oil to each mold fastening cylinder 2a to a mold fastening oil chamber 2b and a mold opening oil chamber 2c, and an oil tank 25.

The mold fastening cylinder 2a is segmented into the mold opening oil chamber 2c and the mold fastening oil chamber 2b by the ram 6 moving the tie bar 7 forward and backward, and includes bypass hydraulic pipes 33 and 36 that are used to allow the mold opening oil chamber 2c and the mold fastening oil chamber 2b to communicate with each other and the logic valve 28 that is provided on the bypass hydraulic pipes 33 and 36 to be switched to a communication/non-communication state of the mold opening oil chamber 2c and the mold fastening oil chamber 2b. A dedicated core back program is programmed such that the logic valve 28 is opened so as to allow the mold opening oil chamber 2c, the mold fastening oil chamber 2b, and the oil tank 25 to communicate with each other, unloading oil circulating in unloading hydraulic pipes 31 and 32 at a hydraulic source are made to communicate with the bypass hydraulic pipes 33 and 36 at the time of performing the core back operation using two sets of mold opening and closing ball screw units 40 and two sets of core back devices 20, and the mold opening oil chamber 2c, the mold fastening oil chamber 2b, the bypass hydraulic pipes 33 and 36, and the unloading hydraulic pipes 31 and 32 are made so as not to communicate with each other at the time except for the core back operation using the core back device 20.

At the time of fastening the mold, the mold is closed by the mold platen opening and closing unit 40, the tie bar 7 is fixed to the movable mold platen 3 through the tie bar fixing unit 11, and the logic valve 28 is switched to a non-connection state where the mold opening oil chamber 2c, the mold fastening oil chamber 2b, the bypass hydraulic pipes 33 and 36, and the unloading hydraulic pipes 31 and 32 do not communicate with each other. Then, a high pressure oil generated by the oil pump 26 and the relief valve 27 is sent to the mold fastening oil chambers 2b of four hydraulic cylinders to fasten the mold, and in this state, the molten resin is injected into the cavity 9. A foaming expanding process is performed as described below at the time point at which the surface of the molten resin contacting the inner surface of the mold is solidified after the injection.

The dedicated core back program embedded in the control device 30 controls two sets of mold opening and closing unit (ball screw units) 40 and two sets of core back devices 20. The dedicated core back program sets a core back target stop reference position value, and independently controls two sets of mold opening and closing unit (ball screw units) 40 and two sets of core back devices 20 during the core back operation. Furthermore, the dedicated core back program sets a stop position offset target value (including an allowable value) with respect to the core back target stop reference position value of each shaft, and sets a value obtained by adding or subtracting the stop position offset value of each corresponding shaft to or from the core back target stop reference position value to a core back target completion position of each shaft of the core back device. Then, the dedicated core back program independently controls the core back speed and the stop position of each mold opening and closing unit the ball screw unit 40 and each core back device 20.

The core back operation after the resin injecting and filling process of the injection foam molding machine and the molded product foaming expanding process inside the mold will be described. After the resin is injected and filled while the tie bar 7 and the movable mold 3 are fixed, the logic valve 28 is switched to a state where the mold opening oil chamber 2c and the mold fastening oil chamber 2b communicate with each other, and the unloading oil circulating unloading hydraulic pipes 31 and 32 at the hydraulic source are made to communicate with the bypass hydraulic pipes 33 and 36.

The mold platen opening and closing unit 40 maintains the movable mold platen 3 in a mold closed state, the tie bar 7 is fixed to the movable mold platen 3 by the tie bar fixing unit 11, and the core back device 20 is driven so that the end surface 18b of the ball screw nut comes into contact with the end surface 21a of the support 21 fixed to the fixed mold platen 2 (when the position where the nut end surface 18b comes into contact with the contact surface 21a is stored on the control program, the nut end surface may be stopped at that position).

Two sets of mold opening and closing unit 40 and two sets of core back devices 20 are independently controlled by the control device 30. En accordance with the shape of the foamed and molded product, the thickness of the foam is set to be different on purpose. Alternatively, since there is a difference in solidification speed, the slightly opening speed or the stop position may not be uniformly set. For this reason, the core back target stop reference position value is set from the calculation or measurement result, and the stop position offset target value (including an allowable value) with respect to the core back target stop reference position of each shaft is set for each of the core back device 20 or the mold opening and closing unit 40. Then, a value obtained by adding or subtracting the stop position offset value of each corresponding shaft to or from each core back target stop reference position value is set to the core back target completion position of each shaft of the core back device, and the core back speed and the stop position of each of the mold opening and closing unit 40 and the core back device 20 are independently controlled. The control device 30 controls the core back operation of two sets of mold opening and closing unit 40 and two sets of core back device 20. At the same time, the control device checks the core back position by feeding back the number of rotations of the ball screw to the control device 30 using the same operation instructing signal wire.

When the resin inside the cavity 9 is foamed and expanded, a foaming force Fp is applied to the movable mold 5. At this time, when a force generated by the forward movement of the core back device 20 and the mold opening and closing unit 40 is denoted by Fc, no gap is formed between the mold and the resin inside the cavity 9 as long as a relationship of Fp>Fc is satisfied (or the core back speed is slower than the expanding speed of the resin). At the time of foaming and expanding the resin, a force Fp+Fc obtained by adding a foaming force Fp to the core back force Fc is added to the tie bar 7 of the hydraulic cylinder 2a and the ram 6 is operated to open the mold, so that a back pressure is caused by a flowing resistance of the hydraulic oil of the hydraulic cylinder 2a to the mold fastening oil chamber 2b. At this time, although there is a resistance in the operation of the ram 6, when a back pressure is actively caused by supplying low pressure oil to the mold fastening oil chamber 2b, the operation of the movable mold platen 3 may be stabilized in the mold opening direction.

Furthermore, since the movement of the movable mold platen 3 is performed by the core back device 20 during the core back operation, the ram 6 of the mold fastening cylinder fixed to the movable mold platen through the tie bar fixing unit 11 and the tie bar 7 is driven in the mold opening direction by the core back device 20, so that the volume of the mold opening oil chamber 2c of the hydraulic cylinder 2a is expanded during the core back operation. Accordingly, the same effect as that of a suction piston pump is exhibited in the hydraulic circuit communicating with the mold opening oil chamber 2c, and a negative pressure is generated in the mold opening oil chamber 2c.

The ram 6 is pulled in the mold closing direction by the back pressure of the mold fastening oil chamber 2b and the negative pressure of the mold opening oil chamber 2c, so that the resistance Fb acts on the ram 6 in the mold opening direction. However, since the logic valve 28 is switched to the state where the mold opening oil chamber 2c and the mold fastening oil chamber 2b communicate with each other, the mold opening oil chamber 2c communicates with the oil tank 25, and the unloading hydraulic pipes 31 and 32 for unload oil circulating with a low pressure at the hydraulic source communicate with the bypass hydraulic pipes 33 and 36, the negative pressure of the mold opening oil chamber 2c is suppressed or resolved. Accordingly, the ram 6 is not pulled in the mold closing direction by the negative pressure of the mold opening oil chamber 2c.

That is, the unload oil circulating with a low pressure (positive pressure) may communicate with the mold opening oil chamber 2c, so that the unload oil may be actively supplied with a positive pressure to the mold opening oil chamber 2c. Accordingly, it is possible to reduce the oil suction amount from the oil tank 25 serving as a large factor causing a negative pressure in the mold opening oil chamber 2c.

Furthermore, at this time, since the mold opening oil chamber 2c communicates with the mold fastening oil chamber 2b, the volume thereof is contracted by the core back operation, so that oil flowing out of the mold fastening oil chamber 2b may be supplied to the mold opening oil chamber 2c. For this reason, the oil suction amount from the oil tank 25 may be further reduced.

As a result, the negative pressure of the mold opening oil chamber 2c is suppressed or resolved, so that the resistance Fb of the movable mold platen 3 in the mold opening direction may be reduced during the core back operation. For this reason, the core back device 20 may be decreased in size and number, and a decrease in mold opening speed and generation of cavitations may be prevented.

Further, since the unload oil only circulating without performing any action may be effectively used, energy efficiency may improve.

When the resin inside the cavity 9 is foamed and the axial position conversion value of the number of rotations of the ball screw of the mold platen opening and closing unit 40 and the core back device 20 reaches a setting value in which the thickness of the foamed resin becomes a predetermined dimension, the core back device 20 and the mold platen opening and closing unit 40 are stopped, the resin is cooled while maintaining a gap between the molds, and the resin is solidified.

In the case of a thin molded product, the core back movement amount is small, but it is desirable that the moving speed of the mold 5 be controlled within the foaming and expanding speed of the resin so as to miniaturize the foamed bubbles. The resin pressure inside the mold cavity 9 may be measured by a resin pressure meter 29 and the moving speed of the mold 5, that is, the advancing speed of the core back device 20 may be controlled by a feed-back control at a constant value so that the resin pressure does not become negative. Alternatively, the foaming and expanding speed of the resin is calculated or measured in advance, and may be controlled so that the speed is lower than the calculated or measured speed.

Second Embodiment

Figure 5:
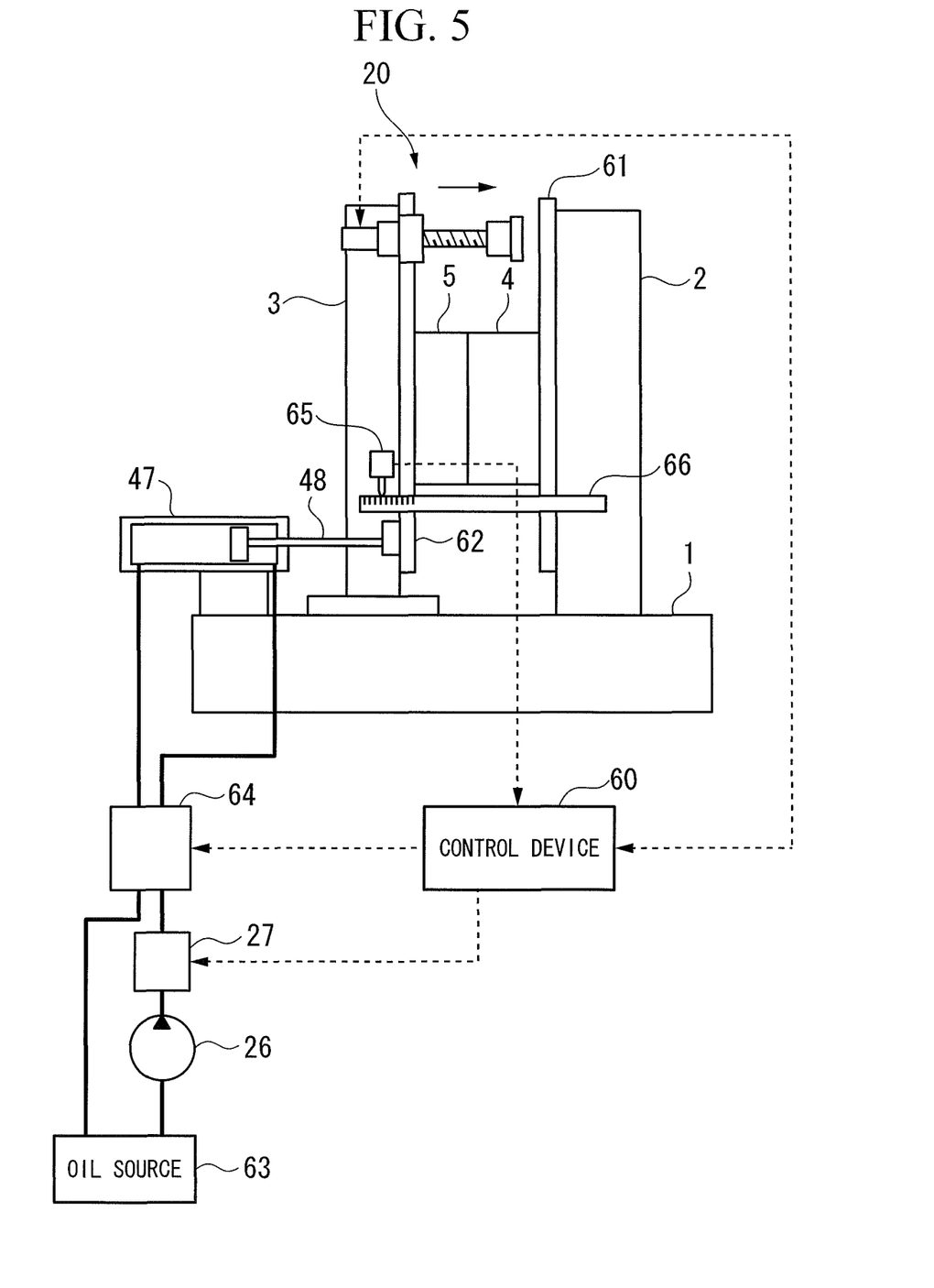
FIG. 5 is a side view illustrating a control system of an injection foam molding machine according to a second embodiment of the invention.

A second embodiment will be described by referring to the drawings. FIG. 5 is a side view illustrating a control system of an injection foam molding machine according to the second embodiment, and FIG. 6 is a front view illustrating a movable mold platen showing an attachment position of a core back device of the injection foam molding machine of FIG. 5.

The injection foam molding machine of the embodiment is provided with two core back devices 20 which are the same as those of the first embodiment. The injection foam molding machine of the second embodiment is different from the injection foam molding machine of the first embodiment in that hydraulic cylinder type driving unit is sued as the mold platen opening and closing unit, the moving position of the movable mold platen near the hydraulic cylinder is detected, and the speed and the position of the core back device 20 are controlled so as to follow the detection value. Since the other points of the second embodiment are the same as those of the first embodiment, the similar points will not be repetitively described.

In FIG. 5, the core back device 20 is attached to an attachment plate 62 detachably fixed to the entire surface of the movable mold platen 3, a mold platen opening and closing hydraulic cylinder 47 is attached to the base platen 1, and a front end of a rod 48 of the mold platen opening and closing hydraulic cylinder 47 is attached to the movable mold platen 3 or the attachment plate 62 detachably fixed to the movable mold platen 3. A scale 66 is attached to a position near the mold platen opening and closing hydraulic cylinder 47 in the fixed mold platen 2, a position sensor 65 detecting the position of the scale 66 is attached to a position near the mold platen opening and closing hydraulic cylinder 47 in the mold platen 3, and when the moving distance of the movable mold platen 3 (the mold 5) moved by the mold platen opening and closing hydraulic cylinder 47 is detected, electrical signals thereof are transmitted to a control device 60. The hydraulic pressure of the high pressure hydraulic oil produced by the hydraulic pump 26 is adjusted by the relief valve 27 and is converted by a servo valve 64.

Figure 6:
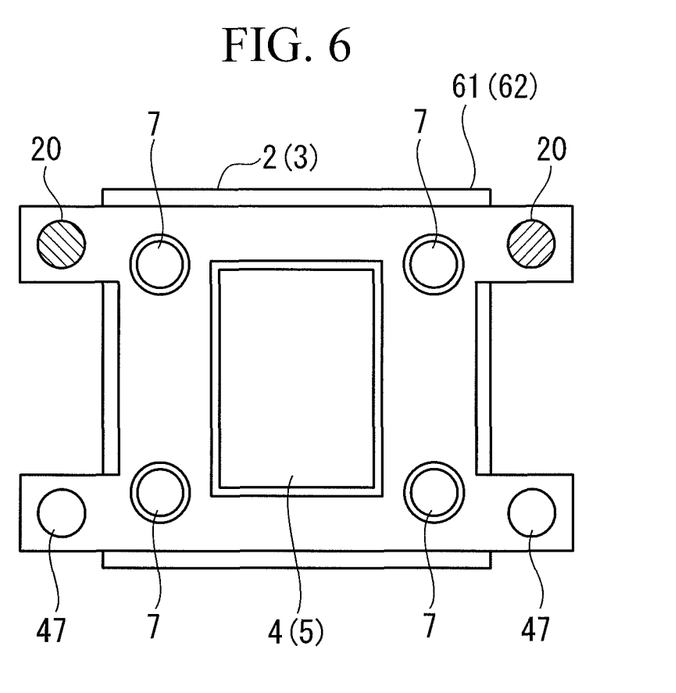
FIG. 6 is a front view illustrating a movable mold platen showing an attachment position of a core back device of the injection foam molding machine of FIG. 5.

The attachment plates 61 and 62 shown in FIG. 6 cover the entire surfaces of the mold platens 2 and 3 so that the front end of the rod 48 of the mold platen opening and closing hydraulic cylinder 47 and the core back device 20 are attached to the mold platens 2 and 3. The contact positions of the hydraulic cylinder 47 and the core back device 20 with respect to the mold platen are shown in FIG. 6. However, in the existing molding machine in which the core back device 20 needs to be further provided, the core back devices may be installed at the diagonal positions shown in FIG. 3.

The core back operation upon foaming and expanding the molded product inside the mold after resin is injected and filled in the mold by the injection molding machine of the second embodiment will be described. In a dedicated core back program embedded in the control device 60, the protrusion position or the speed of the rod 48 protruding from the mold opening and closing hydraulic cylinder 47 is master-controlled, the position or the speed of the ball screw core back device 20 is slave-controlled, and a master-slave control is performed so that the core back device 20 follows the average value of the moving amount or the moving speed of the hydraulic cylinder rod 48 measured by the position sensors 65 of two sets of mold opening and closing hydraulic cylinders 47.

The hydraulic cylinders 47 as two sets of mold opening and closing unit are independently controlled the control device 60. The speed and the stop target position of the rod 48 of each mold opening and closing hydraulic cylinder 47 are independently set from a calculation or measurement result, the gradation of the scale 66 attached to the fixed mold platen 2 is checked by the position sensor 65 to detect the relative position or the relative speed between the fixed mold 4 and the movable mold 5, and in this state, the movable mold platen 3 is moved to slightly open the mold 4 and the mold 5.

Two sets of core back devices 20 rotate the ball screw 16 and move the ball screw nut 18 to follow the average value of the data of the relative opening speed or the position between the molds 4 and 5 detected by two sets of position sensor 66 (refer to FIG. 4), and are controlled to perform the slight opening operation at the same speed or position as that of the rod 48 of each mold platen opening and closing hydraulic cylinder 47.

On the assumption that the foaming force of the resin inside the cavity 9 is denoted by Fp and the core back force generated by the forward movement of the core back device 20 and the hydraulic cylinder 47 is denoted by Fc, when a relation of Fp>Fc is satisfied (or the core back speed is slower than the resin expanding speed), no gap is formed between the mold and the resin inside the cavity 9. At the time of foaming and expanding the resin, the relation in which the force Fp+Fc obtained by adding the foaming force Fp to the core back force Fc is applied to the tie bar 7 of the hydraulic cylinder 2a so that the ram 6 causes a back pressure in the mold fastening oil chamber 2b of the hydraulic cylinder 2a and a relation in which a negative pressure is caused in the mold opening oil chamber 2c due to the movement of the ram 6 are the same as those of the first embodiment.

When the resin inside the cavity 9 is foamed and the stop position of the hydraulic cylinder 47 and the number of rotations of the ball screw of the core back device 20 reach a setting value in which the thickness of the foamed resin becomes a predetermined dimension, the hydraulic cylinder 47 of the mold platen opening and closing unit and the core back device 20 are stopped, the resin is cooled while maintaining a gap between the molds, and the resin is solidified.

Third Embodiment

Figure 7:
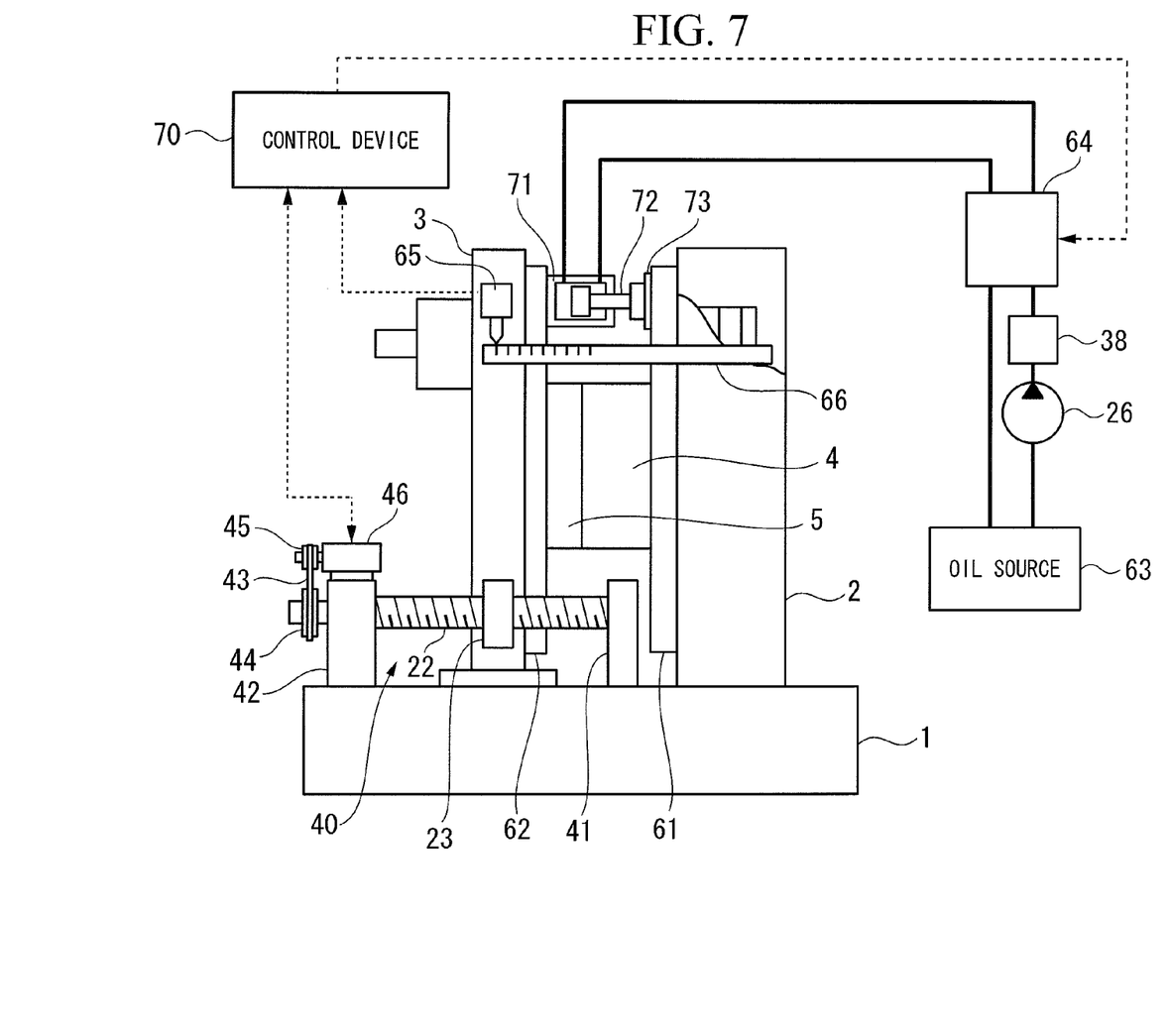
FIG. 7 is a side view illustrating a control system of an injection foam molding machine according to a third embodiment of the invention.

A third embodiment will be described by referring to the drawings. FIG. 7 is a side view illustrating a control system of an injection foam molding machine according to the third embodiment, and FIG. 8 is a front view illustrating a movable mold platen showing an attachment position of a core back device of the injection foam molding machine of FIG. 7.

The injection foam molding machine of the embodiment is different from the injection foam molding machine of the first embodiment and the injection foam molding machine of the second embodiment in that ball screw type driving unit is used as the mold platen opening and closing unit, a hydraulic cylinder is used as the core back device, and the movable mold platen opened and closed by the ball screw type driving unit is controlled in accordance with the detection value of the position or the speed of the hydraulic cylinder type core back device. Since the other devices are the same as those of the molding machine of the first embodiment, similar points will not be repetitively described.

Figure 8:
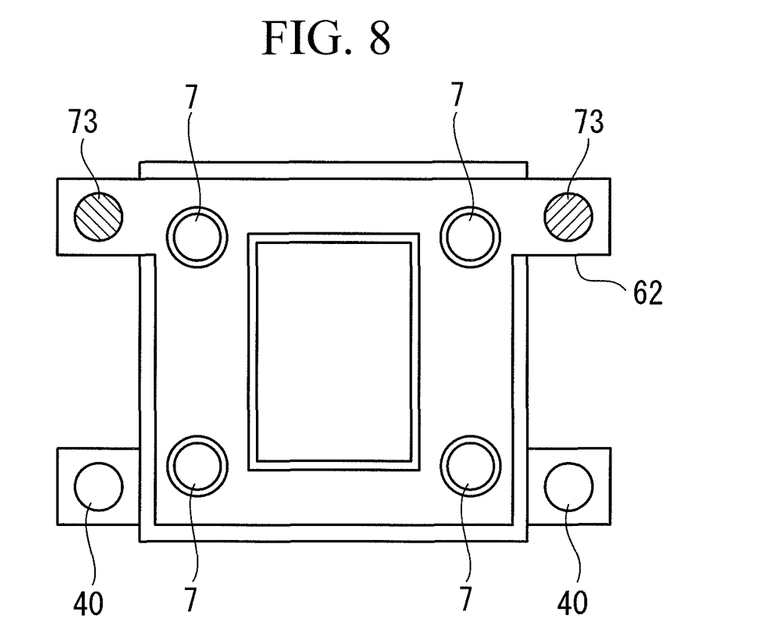
FIG. 8 is a front view illustrating a movable mold platen showing an attachment position of a core back device of the injection foam molding machine of FIG. 7.

In FIGS. 7 and 8, two sets of core back hydraulic cylinders 71 are attached to the movable mold platen 3 or the attachment plate 62 detachably fixed to the entire surface of the movable mold platen 3, and two sets of mold platen opening and closing ball screw type mold platen opening and closing unit 40 are attached to the base platen 1. A front end of a rod 72 of the dedicated core back hydraulic cylinder 71 comes into contact with the surface of the attachment plate 61 detachably fixed to the entire surface of the fixed mold platen 2 or the movable mold platen 3. The scale 66 is attached to a position near the dedicated core back hydraulic cylinder 71 in the fixed mold platen 2, and the position sensor 65 detecting the relative positions of the mold 4 and the mold 5 by detecting the gradation of the scale 66 is attached to a position near the dedicated core back hydraulic cylinder 71 in the mold platen 3.

The hydraulic pressure of the high pressure hydraulic oil produced by the hydraulic pump 26 is adjusted by the pressure reducing valve 38 and the high pressure hydraulic oil is sent to the dedicated core back hydraulic cylinder 71. Subsequently, when the moving distance of the mold platen 3 (the mold 5) slightly opened by the core back operation using the dedicated core back hydraulic cylinder 71 is detected, electrical signals thereof are transmitted to a control device 70. The control device 70 controls the switching of the servo valve 64 so that the moving speed or the stop position of the mold platen 3 (the mold 5) becomes a setting value.

The attachment plates 61 and 62 cover the entire surfaces of the mold platens 2 and 3 so that the hydraulic cylinder 71 is attached to the mold platens 2 and 3. The contact positions of the hydraulic cylinder 71 and the ball screw mold platen opening and closing unit 40 with respect to the mold platen are shown in FIG. 8. However, the mold platen opening and closing unit 40 of the existing molding machine in which the dedicated core back hydraulic cylinder 71 needs to be further provided may have a layout at the diagonal positions as shown in FIG. 3. In this case, the protrusion portions of the attachment plates 61 and 62 may be present at the diagonal positions.

The core back operation upon foaming and expanding the molded product inside the mold after resin is injected and filled in the mold by the injection molding machine of the third embodiment will be described. In a dedicated core back program embedded in the control device 70, the position or the speed of the rod 72 protruding from the dedicated core back hydraulic cylinder 71 is master-controlled, the position or the speed of the ball screw mold platen opening and closing unit 40 is slave-controlled, and a master-slave control is performed so that the speed and the position or the speed of the ball screw mold platen opening and closing unit 40 follow the average value of the moving amount or the moving speed of the molds 4 and 5, pressed by the rods 72 of two sets of dedicated core back hydraulic cylinders 71, measured by two sets of relative position sensors 65.

The ball screw mold platen opening and closing unit 40 as two sets of mold opening and closing unit and two sets of dedicated core back hydraulic cylinder 71 are independently controlled by the control device 70. The speed and the target stop position of the rod 72 of each dedicated core back hydraulic cylinder 71 are independently set from the calculation or measurement result, the relative position or the relative speed between the fixed mold 4 and the movable mold 5 is detected by checking the gradation of the scale 66 attached to the fixed mold platen 2 by using the position sensor 65, and then the movable mold platen 3 is moved to slightly open the mold 4 and the mold 5.

Two sets of ball screw mold platen opening and closing unit 40 rotate the ball screw 22 and move the ball screw nut 23 to follow the average value of the data of the relative opening speed or the position between the molds 4 and 5 detected by two sets of position sensors 66, and are controlled to perform the slight opening operation at the same speed or position as that of the rod 72 of each dedicated core back hydraulic cylinder 71.

On the assumption that the foaming force of the resin inside the cavity 9 is denoted by Fp and the core back force generated by the forward movement of the core back hydraulic cylinder 71 and the ball screw mold platen opening and closing unit 40 is denoted by Fc, when a relation of Fp>Fc is satisfied (or the core back speed is slower than the resin expanding speed), no gap is formed between the mold and the resin inside the cavity 9. At the time of foaming and expanding the resin, the relation in which the force Fp+Fc obtained by adding the foaming force Fp to the core back force Fc is applied to the tie bar 7 of the hydraulic cylinder 2a so that the ram 6 causes a back pressure in the mold fastening oil chamber 2b of the hydraulic cylinder 2a and a relation in which a negative pressure is caused in the mold opening oil chamber 2c due to the movement of the ram 6 are the same as those of the first embodiment.

When the resin inside the cavity 9 is foamed and the stop position of the rod 72 of the dedicated core back hydraulic cylinder 71 and the number of rotations of the ball screw of the ball screw type mold platen opening and closing unit 40 reach a setting value in which the thickness of the foamed resin becomes a predetermined dimension, the dedicated core back hydraulic cylinder 71 and the ball screw type mold platen opening and closing unit 40 are stopped, the resin is cooled while maintaining a gap between the molds, and the resin is solidified.

Fourth Embodiment

Figure 9:
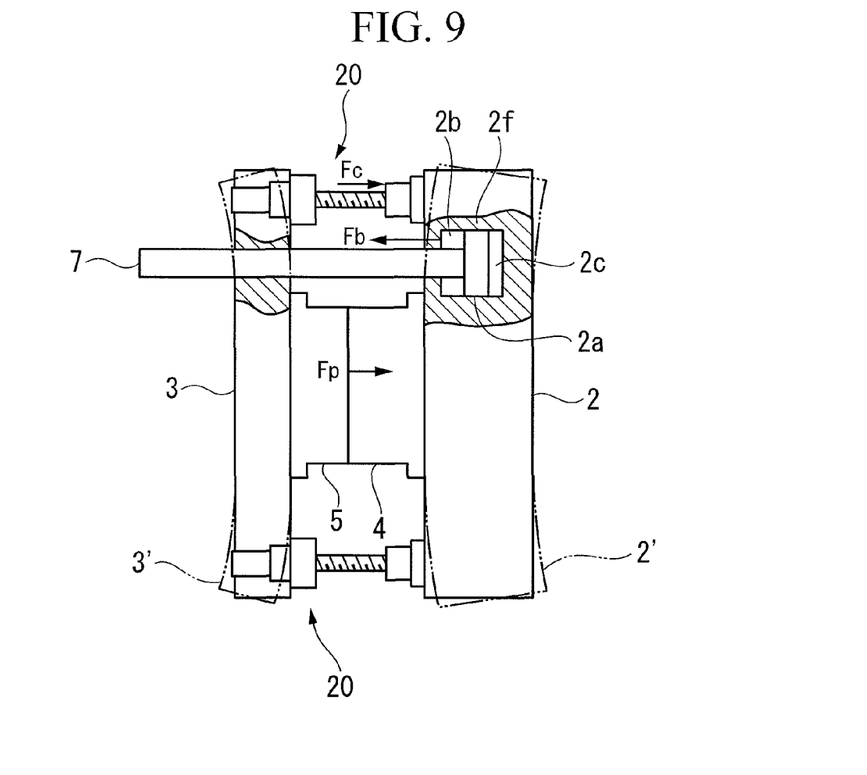
FIG. 9 is a side view illustrating a state where the mold platen is deformed when operating the core back device of the movable mold platen of the injection foam molding machine of FIG. 1.

In the injection foam molding machines of the first, second, and third embodiments, the mold is fastened by the mold fastening cylinder 2a, and the mold is slightly opened by the force Fc of the core back device against the operation resistance Fb of the ram 6. Even when the countermeasure for reducing the force of the resistance Fb is provided as in the first, second, and third embodiments, a considerable force may applied to the fixed mold platen 2 and the movable mold platen 3. In such a case, although it is an extreme expression, a deformation may be caused as depicted by the two-dotted chain lines 2' and 3' of FIG. 9. Since a delicate dimension precision is demanded during the foaming and molding operation, it is more desirable to suppress the deformation of the mold platens 2 and 3 as much as possible.

Figure 10:
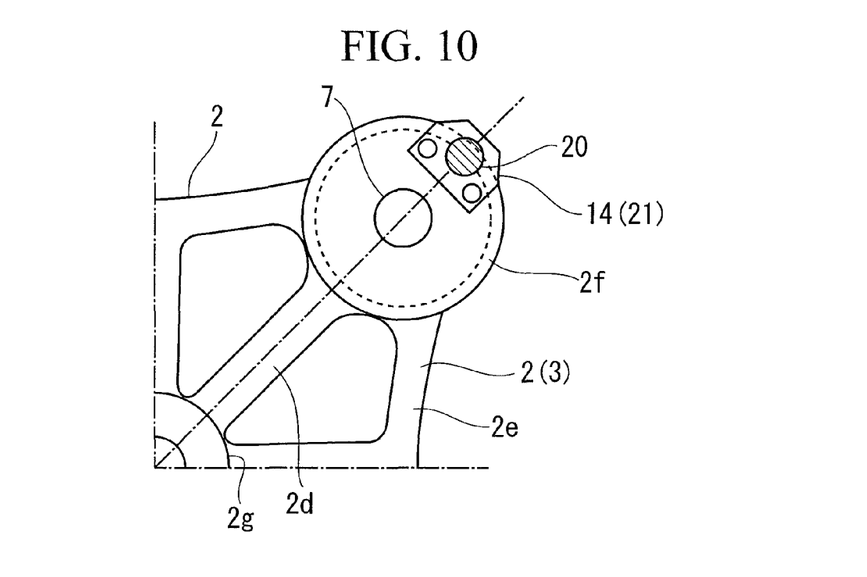
FIG. 10 is a front view illustrating the attachment position of the core back device where the deformation of the mold platen is decreased as much as possible when operating the core back device of the movable platen of the injection foam molding machine of FIG. 1.

The configuration of reducing the deformation amount of the mold platen 2 as much as possible is as below. The fixed mold platen 2 of the injection foam molding machine includes an annular rib 2g which is formed around a cylindrical portion provided at the center of the mold platen so as to allow the injection cylinder 8 (refer to FIG. 1) to enter and exit thereto or therefrom and a rib 2d which is radially connected to the mold fastening cylinder 2a from the rib 2g, where the attachment center of the core back device 20 is present on the inner wall of the mold fastening cylinder 2a on the extension line of the radial rib 2d. Since the radial rib 2d has high bending rigidity of the mold platen with respect to the mold fastening force of the mold fastening cylinder 2a provided at each of four corners of the mold platen and the mold fastening cylinder 2a is solid and has high rigidity with respect to the direction of the core back force, the rigidity of the mold platen 2 may become stronger against the pushing force of the core back device 20.

Further, in order to improve the rigidity of the fixed mold platen 2 and the movable mold platen 3 and install the core back device 20 at the desirable position, as shown in FIGS. 6 and 8, the core back device attachment plates 61 and 62 may be provided which are respectively attached to or detached from the mold attachment surfaces of the fixed mold platen 2 and the movable mold platen 3 and are used to prevent the core back device 20 from interfering with by the mold attachment region originally included in the mold platen.

INDUSTRIAL APPLICABILITY

According to the invention, an injection foam molding machine may be provided which may decrease the size and the number of core back devices and is cheap by performing a core back operation using both a dedicated core back device and a mold platen moving device originally included in the injection molding machine. Also, an injection foam molding machine may be provided which may reduce the core back resistance and prevent a decrease in mold opening speed by filling a mold opening oil chamber of a mold fastening cylinder with unload oil of a hydraulic circuit during the core back operation.

REFERENCE SIGNS LIST

2: FIXED MOLD PLATEN
2a: MOLD FASTENING HYDRAULIC CYLINDER
2b: MOLD FASTENING OIL CHAMBER
2c: MOLD OPENING OIL CHAMBER
3: MOVABLE MOLD PLATEN
4: FIXED MOLD
5: MOVABLE MOLD
6: RAM
7: TIE BAR
9: CAVITY
11: TIE BAR FIXING UNIT
12, 46: SERVO MOTOR
13: LARGE DECELERATION RATIO PLANETARY GEAR SPEED REDUCER
16: BALL SCREW SHAFT
18: BALL SCREW NUT
20: CORE BACK DEVICE
22: BALL SCREW SHAFT
23: BALL SCREW NUT
27: ELECTROMAGNETIC PROPORTIONAL CONTROL RELIEF VALVE
28: LOGIC VALVE
29: IN-MOLD PRESSURE SENSOR
30, 60, 70: CONTROL DEVICE
38: PRESSURE REDUCING VALVE
40: MOLD PLATEN OPENING AND CLOSING UNIT
47: MOLD PLATEN OPENING AND CLOSING HYDRAULIC CYLINDER
61, 62: CORE BACK DEVICE ATTACHMENT PLATE
64: SWITCHING VALVE
65: POSITION DETECTING SENSOR
66: SCALE
71: DEDICATED CORE BACK HYDRAULIC CYLINDER

The invention claimed is:

1. An injection foam molding machine comprising:
a movable mold platen;
a fixed mold platen;
a mold fastening hydraulic cylinder that is provided at each of four corners of both mold platens;
a tie bar that is driven by the hydraulic cylinder to fasten the molds;
two sets of mold opening and closing actuators that drive the movable mold platen to move close to or away from the fixed mold platen;
two sets of electrically driven core back devices, each of the electrically driven core back device including a motor, a speed reducer coupled to the motor, a ball screw shaft of which one end is coupled to an output shaft of the speed reducer and the other end is a free end, and a nut screwed onto the ball screw shaft;
a control device that controls the mold opening and closing actuators and the electrically driven core back devices; and
a contact support which is disposed so that an end surface of the contact support faces to an end surface in an axial direction of the nut and which has the hollow portion along the axial direction into which the other end of the ball screw shaft is capable of being inserted,
wherein the nut is capable of moving close to or away from the end surface of the contact support by drive of the electrically driven core back device,
the control device moves the movable mold platen away from the fixed mold platen by using the two sets of the mold opening and closing actuators and by using the two sets of electrically driven core back devices so as to move the nut to push the end surface of the contact support during a foaming core back operation, and
the two sets of electrically driven core back devices are installed as follows;
when both sets of the mold opening and closing actuators are installed at under sides of both mold platens, both sets of electrically driven core back devices are installed at upper sides of the mold platens,
when both sets of the mold opening and closing actuators are installed at each of two diagonal corners of the mold platens, both sets of electrically driven core back devices are installed at each of another two diagonal corners of the platens.

2. The injection foam molding machine according to claim 1,
wherein the speed reducer is a large deceleration ratio planetary gear speed reducer.

3. The injection foam molding machine according to claim 1,
wherein the mold opening and closing actuator is a mold opening and closing ball screw unit that includes a servo motor, a speed reducer, a ball screw shaft, and a ball screw nut threaded into the screw shaft.

4. The injection foam molding machine according to claim 1,
wherein the mold opening and closing actuator is a hydraulic actuator that includes a hydraulic cylinder, a position sensor detecting a position of an operation shaft of the hydraulic cylinder, and a servo valve.

5. The injection foam molding machine according to claim 3,
wherein the control device includes a dedicated core back program that simultaneously controls the mold opening and closing actuators and the electrically driven core back devices during a foaming core back operation,
wherein the dedicated core back program independently controls the mold opening and closing ball screw units and the electrically driven core back devices on the basis of respective predetermined core back target stop reference position values,
wherein respective stop position offset target values of the mold opening and closing ball screw units and the electrically driven core back devices are set with respect to the core back target stop reference position values, and
wherein the core back amounts of the mold opening and closing ball screw units and the electrically driven core back devices are independently controlled in a manner such that values respectively obtained by adding or subtracting the respective corresponding stop position offset values to or from the respective core back target reference position values are set as respective core back target completion position values.

6. The injection foam molding machine according to claim 4,
wherein the control device includes a dedicated core back program that simultaneously controls the mold opening and closing actuators and the electrically driven core back devices during a foaming core back operation,
wherein the dedicated core back program performs a master-slave control so that the position or the speed of the electrically driven core back device follows the average value of the moving amount or the moving speed of the hydraulic cylinder measured by the position sensor by master-controlling the position or the speed of the hydraulic cylinder and slave-controlling the position or the speed of the electrically driven core back device.

7. The injection foam molding machine according to claim 1,
wherein the hydraulic cylinder is segmented into a mold opening oil chamber and a mold fastening oil chamber by a ram moving the tie bar forward and backward,
wherein the injection foam molding machine further comprises a bypass hydraulic pipe allowing the mold opening oil chamber and the mold fastening oil chamber to communicate with each other and a switching valve provided on the bypass hydraulic pipe to be switched to any one of a communication state and a non-communication state between the mold opening oil chamber and the mold fastening oil chamber,
wherein the control device includes a dedicated core back program that simultaneously controls the mold opening and closing actuators and the electrically driven core back devices during a foaming core back operation,
wherein during the core back operation using the mold opening and closing actuators and the electrically driven core back devices, the dedicated core back program opens the switching valve so that the mold opening oil chamber, the mold fastening oil chamber, and an oil tank communicate with each other and an unloading oil circulating unloading hydraulic pipe at a hydraulic source communicates with the bypass hydraulic pipe, and
wherein when the core back operation is not performed, the bypass hydraulic pipe and the unloading hydraulic pipe do not communicate with each other.

8. The injection foam molding machine according to claim 1,
wherein the fixed mold platen includes a substantially cylindrical first rib formed at the center of the fixed mold platen and a second rib radially connecting the first rib and the hydraulic cylinder to each other from the first rib, and
wherein the electrically driven core back device is installed so that the attachment center of the electrically driven core back device is present on an inner wall of the mold fastening cylinder on the extension line of the second rib.

9. The injection foam molding machine according to claim 1, further comprising:
a core back device attachment plate that is detachably attached to each mold attachment surface of the fixed mold platen or the movable mold platen and is used to attach the electrically driven core back device to a position not interfered with by a mold attachment region of the mold platen.

10. The injection foam molding machine according to claim 1,
wherein the two sets of electrically driven core back devices are fixed to one of the movable mold platen and the fixed mold platen, and
a contact support is fixed to the other of the movable mold platen and the fixed mold platen.

11. The injection foam molding machine according to claim 1,
wherein the two sets of electrically driven core back devices are fixed to the movable mold platen, and
a contact support is fixed to the fixed mold platen.

* * * * *